United States Patent [19]

Janowski et al.

[11] 4,246,057
[45] Jan. 20, 1981

[54] HEAT TRANSFER SURFACE AND METHOD FOR PRODUCING SUCH SURFACE

[75] Inventors: Kenneth R. Janowski, Wheaton; Ming S. Shum, Des Plaines; Steven A. Bradley, Northbrook, all of Ill.

[73] Assignee: UOP Inc., Des Plaines, Ill.

[21] Appl. No.: 864,901

[22] Filed: Dec. 27, 1977

Related U.S. Application Data

[62] Division of Ser. No. 769,623, Feb. 16, 1977, Pat. No. 4,129,181.

[51] Int. Cl.³ .............. B29C 27/28; B32B 33/00; C25D 5/54; F28F 13/18
[52] U.S. Cl. .............. 156/150; 29/157.4; 29/459; 138/144; 138/145; 138/146; 156/82; 156/155; 156/187; 165/133; 165/180; 165/181; 165/184; 204/11; 204/20; 204/37 R; 427/224; 427/227; 427/250; 427/306; 428/311; 428/313
[58] Field of Search ............ 156/82, 150, 187, 155; 165/133, 180, 181, 183, 184; 204/11, 20, 37 R; 427/250, 296, 306, 404, 224, 225, 227; 428/310, 311, 313; 29/157.4, 459; 138/144, 145, 146

[56] References Cited

U.S. PATENT DOCUMENTS

| 3,549,505 | 12/1970 | Hanusa | 204/11 |
|---|---|---|---|
| 3,679,552 | 7/1972 | Jervis | 204/37 R |
| 3,778,336 | 12/1973 | Adams | 264/29.1 X |
| 3,968,786 | 7/1976 | Spielberg | 126/270 |
| 4,026,747 | 5/1977 | Delorean et al. | 156/171 |
| 4,077,853 | 3/1978 | Coll-Palagos | 427/306 X |
| 4,093,755 | 6/1978 | Dahl et al. | 427/299 |
| 4,136,427 | 1/1979 | Shum | 29/157.4 |
| 4,136,428 | 1/1979 | Godsey et al. | 29/157.4 |

FOREIGN PATENT DOCUMENTS

| 1199404 | 7/1970 | United Kingdom . |
| 1238183 | 7/1971 | United Kingdom . |
| 1242864 | 8/1971 | United Kingdom . |

OTHER PUBLICATIONS

"Foametal News", Foametal, Inc., Willoughby, Ohio, Issue No. 6, Jan. 1977.

*Primary Examiner*—John T. Goolkasian
*Assistant Examiner*—Robert A. Dawson
*Attorney, Agent, or Firm*—James R. Hoatson, Jr.; Barry L. Clark; William H. Page, II

[57] ABSTRACT

The invention relates to improving the heat transfer properties in boiling liquids of tubes and other surfaces by applying a very porous reticulated organic foam layer in contact with the tube surface, and then plating a thin metal coating on the foam substrate. Preferably, the tube is copper and the plating consists of a first electrolessly applied layer of copper and a second electroplated layer. The foam is preferably in the form of a thin tape which is spirally wound about the tube. Pyrolization of the foam after plating improves the heat transfer performance of the tube.

6 Claims, 4 Drawing Figures

U.S. Patent     Jan. 20, 1981     4,246,057
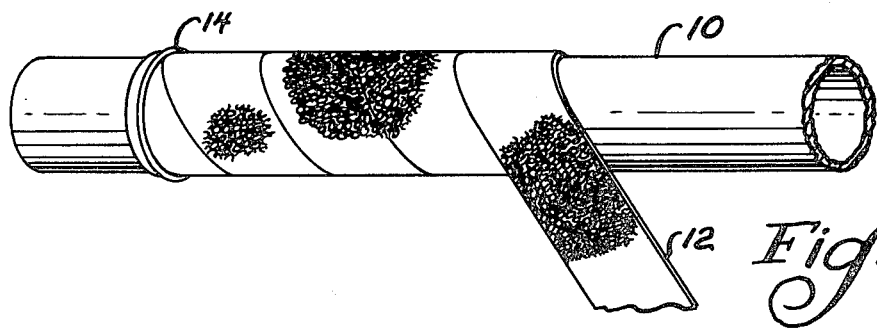
Fig. 1
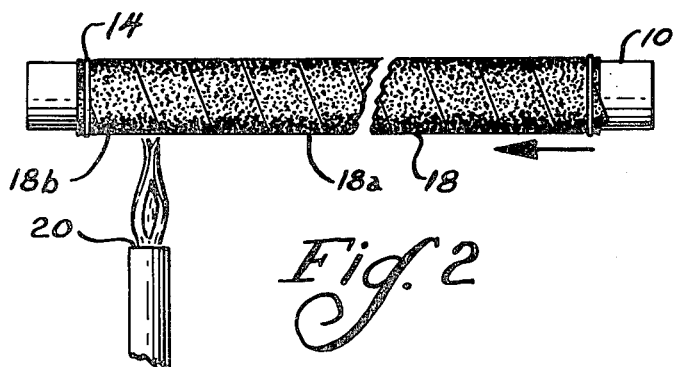
Fig. 2
Fig. 3
Fig. 4
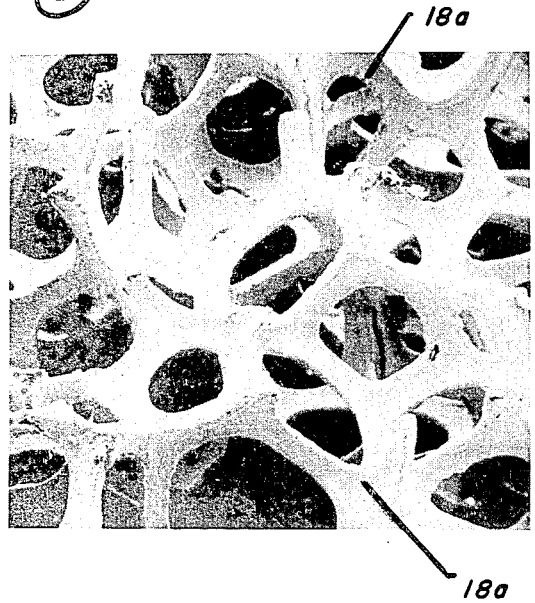
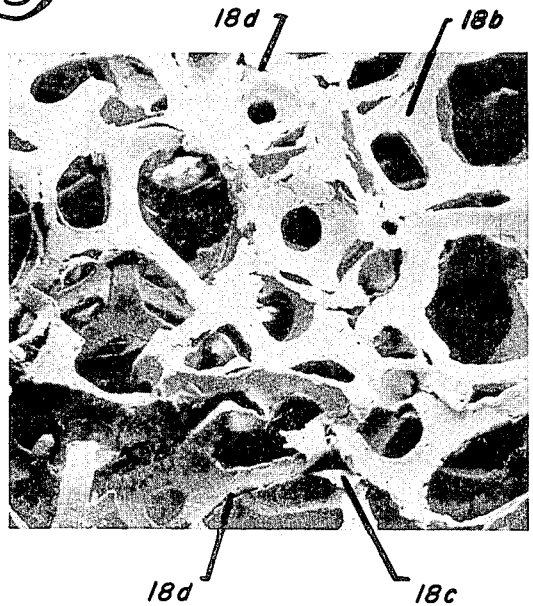

HEAT TRANSFER SURFACE AND METHOD FOR PRODUCING SUCH SURFACE

This is a division of application Ser. No. 769,623, filed Feb. 16, 1977, now U.S. Pat. No. 4,129,181, and is related to U.S. Pat. Nos. 4,136,427, and 4,136,428 assigned to a common assignee.

BACKGROUND OF THE INVENTION

Improved heat transfer tube technology in recent years has been highly dependent upon the improvement of two phase heat transfer, that is the transfer of thermal energy due to the phase transformation from the liquid to the vapor phase. The methods to improve this two phase heat transfer include both passive and active techniques. Passive techniques include surface treatments, roughening the surface, extending the surfaces, displaced enhancement, swirl flow techniques, alteration of surface tension, and the inclusion of additives to the coolant. Active techniques include mechanical aids, surface vibration, fluid vibration, and the addition of electrostatic fields.

In the area of treated surfaces, various materials are deposited on the heat transfer tube surfaces to promote boiling. Such materials have included Teflon, tube surface oxides, and the addition of high surface copper powder. These surface treatments improve the wettability of the surface and result in a low wall super heat which eliminates boiling curve hysteresis.

Surface roughening is a technique to provide a large number of nucleation sites on the tube surface. The technique involves the mechanical deformation of the surface to provide a large number of reentrant cavities.

Extended surface tubes are produces by finning techniques which yield high external surface areas to the tube and allow very large heat transfer rates if the base temperature is in the film boiling range; however, nucleate boiling is not promoted with this type of heat transfer tube.

Displaced enhancement techniques promote boiling by taking advantage of hydrodynamic instability in the coolant when open structures are placed directly above the heat transfer surface.

Surface tension devices operate on the wicking principle which relies on capillary forces while the addition of additives to the coolant affects the wettability of the coolant to the heat transfer tube.

A number of mechanical boiling aids have been proposed including rotating of the boilers themselves, the introduction of rotating plates, and the introduction of bubbles into the vicinity of the heat surface.

The purpose of vibrating either the fluid or the surface is to form localized nucleate boiling sites due to pressure variations in the liquid. The use of electrostatic fields improves mixing within the coolant and is used principally with poorly conducting or dielectric fluids.

Of the above techniques, those that promote nucleate boiling are of principal interest from a technological viewpoint. The theory of nucleate boiling has been well developed and is well understood at this point. The variables that are involved in promoting vapor phase nucleation are well understood. The parameters of importance in a nucleate boiling tube-coolant system include the specific heat of the liquid, the specific heat of the tube material, the heat transfer coefficient, the latent heat of vaporization, the thermal conductivity of the liquid and the heater tube, the geometry of the nucleation site, the temperature of the coolant, vapor, and surface, the liquid viscosity, the surface tension, and the densities of the liquid and vapor phases.

The nucleate boiling phenomenon involves two separate operations. The first of these is the nucleation of the vapor phase within the liquid while the second is the subsequent growth of the vapor phase to form bubbles within the liquid. It has been postulated that improved efficiency of heat transfer can be attained when the nucleation process does not have to be continuously redone. This nucleation process requires a large amount of superheating. Improved efficiency can be observed if the thermal energy is transferred by the growth of pre-existing vapor phase nuclei. This approach has resulted in the specification of re-entrant cavities as highly effective nucleate boiling sites.

A number of patents have been issued whereby the surface of a heat transfer tube is mechanically altered to provide these re-entrant sites. These include U.S. Pat. No. 3,326,283 by Ware, U.S. Pat. No. 3,454,081 by Kun, U.S. Pat. No. 3,566,514 by Szumigala, U.S. Pat. No. 3,881,342 by Thorne, and U.S. Pat. No. 3,906,604 by Kakizaki. While all of the above patents propose the improvement of nucleation by the mechanical introduction of nucleation sites, they all suffer from the common characteristic of having a relatively few number of nucleation sites per given area of tubing surface. This limitation is imposed by the manufacturing tooling required to produce the tubes, and is an inherent limitation for any mechanically produced tube.

The demonstrated heat transfer capability of a tube produced with a much higher density of nucleation sites is covered in U.S. Pat. No. 3,384,154 by Milton. This tube is of the treated surface variety mentioned above where copper powder particles are sintered to the surface of the heat exchanger tube. This provides a very high density of nucleation sites on the tube surface and allows retention of the vapor phase throughout the open pore structure of the sintered surface.

This sintered surface tube, while an effective boiling surface and heat transfer tube, suffers from manufacturing difficulties. The copper powder is mixed with an organic binder and sprayed onto the tube surface for ease of handling. The coated tube is then subjected to a high temperature exposure. This decomposes the organic binder and sinters the copper particles together as well as to the base tube. The Milton patent states the sintering temperature to be about 1760° F. which is about 180° F. below the melting point of copper. This high temperature treatment is not only difficult to do but can result in serious degradation of the mechanical properties of the base tube. The degradation problems can be minimized by utilizing alloys whose superior recrystallization and grain growth characteristics will reduce the amount of property degradation but such alloys introduce added cost and have lower thermal conductivity.

SUMMARY

It is among the objects of the present invention to provide an improved heat transfer surface and a method of making same which will produce a very high density of nucleation sites at a relatively low cost and without affecting the properties of the base tube. These and other objects are achieved by the method of the present invention which involves the coating of a heat transfer tube, plate or other form of heat transfer surface with a reticulated, open cell organic foam such as polyurethane. The foam can be in the form of a thin strip or tape that is spirally wound around the base tube or it can be in a tubular shape which could be slipped over the tube. The foam coating can also be directly applied to the tube surface if it is foamed in such a manner as to leave open cells rather than a closed cell skin in contact with the base tube. The open celled nature of the foam allows free and easy excess of the coolant all the way to the tube surface. The geometries of the nucleation sites within the foam can be easily controlled by the foam formulation as is well understood.

The reticulated foam comprises a substrate upon which copper is plated in a multistep operation. The initial step is to electroless plate copper using well known technology as will be discussed in detail below. After the surface of the organic foam is made electrically conductive with the copper electroless deposition, standard electroplating of copper is then used to build this surface layer up to the point where it has structural integrity. After washing and drying of the plated foam, the organic precursor can be pyrolyzed if desired.

In making experimental tubes we used a reticulated polyurethane foam of 97% void volume with a pore size controlled at 100 pores per linear inch. For the experimental tubes, strips approximately 1 inch wide by 0.062 inch thickness were wrapped in a spiral fashion along the length of the base tube and mechanically held in place by an elastic band during the plating operation. The foam was first cleaned using Enthone PC-452 cleaner at 140° F. After washing, the surface was neutralized with Enthone AD-480 at room temperature. Water washing was then followed by a 15% HCl room temperature cleaning. The preheated foam was then washed and given a room temperature exposure to Enthone 432 sensitizer, washed, then activated at room temperature with Enthone 40 activator. The assembly was then double water rinsed and dried.

Electroless plating was done at 70°–75° F. using Enthone solution CU-404. The electroless plating was allowed to build up until the foam was sufficiently electrically conductive to be measured with a VOM. After washing and drying the electroless tube was then electroplated in a standard copper sulfate electroplating solution using a copper electrode and a DC voltage. Electroplating was continued until a sufficiently thick copper electrodeposit was formed so that the foam had sufficient strength to allow normal handling.

Heat transfer testing of an as-plated tube in Refrigerant R-11 showed a considerable improvement in the surface nucleation boiling characteristics of this tube as compared to a standard fin tube. The boiling characteristics were also superior to a commercially available nucleate boiling tube produced by mechanical means in accordance with the aforemention Kakizaki patent. Observation of the surface boiling characteristics when compared with a length of tubing as produced in accordance with the Milton patent showed that nucleation on the foam surface was quite close to that produced by the sintered copper surface.

The effect of pyrolysis of the polyurethane foam on surface structure and boiling characteristics was then determined. The plated foamed tube as held in a laboratory gas flame until pyrolysis of the polyurethane substrate was complete. Optical and scanning electron microscopy of the remaining copper foam showed a series of very small pores along the surfaces of the skeletal copper remaining after the pyrolysis of the substrate. These pores varied in size with a maximum of about 0.002 inches in their largest dimension. The pores were probably produced by the pressure created during the pyrolysis of the organic substrate.

Boiling tests of the pyrolyzed tube in the same R-11 coolant as used previously indicated superior performance of the pyrolyzed tube as compared to the tube before pyrolysis. This is undoubtedly due to the large number of very tiny vapor phase nucleation sites resulting from the porosity due to the pyrolysis. Since the polyurethane can be pyrolized at temperatures in the range of 575°–900° F. it is obvious that the degradation problems which can take place at temperatures closer to the melting point of copper are of little consequence.

BRIEF DESCRIPTION OF THE DRAWINGS

FIG. 1 is a perspective view showing a thin strip of reticulated foam being wound about a plain tube;

FIG. 2 is a front view of a tube which has been wrapped with foam and then plated being passed over a flame to pyrolyze the foam;

FIG. 3 is a photomicrograph showing a portion of the plated surface of FIG. 2 before it has been pyrolyzed; and FIG. 4 is a photomicrograph showing a portion of the plated surface of FIG. 2 after it has been pyrolyzed.

DESCRIPTION OF THE PREFERRED EMBODIMENT

Referring to FIG. 1, a copper tube 10 which has been thoroughly cleaned has a strip 12 of reticulated polyurethane or other organic open celled foam material wound around it. The starting end can be anchored in place by a mechanical holding means such as an elastic band 14. The opposite end of the foam strip 12 would be similarly anchored. After the tube is wrapped with foam, it is electrolessly plated with copper and then electroplated as previously described. A plating thickness in the range of 0.00025–0.0025 inches would seem to be sufficient.

In FIG. 2, the tube 10 is shown after the foam layer 12 has been plated with a coating 18 of copper. Although the tube 10 can provide excellent performance in nucleate boiling with the non-pyrolyzed surface portion 18a, tests have shown that substantial improvements in performance are achieved by pyrolyzing, such as with a burner 20, to provide a pyrolyzed surface 18b.

FIG. 3 is an approximately 100 X photomicrograph of the surface area 18a of FIG. 2. The copper plating can be seen as completely coating the underlying network of foam which it surrounds.

FIG. 4 is an approximately 100 X photomicrograph of the pyrolyzed surface area 18b of FIG. 2. In comparing FIG. 4 to FIG. 3, one can see that the copper plating tends to break away as shown at 18c and fissure as shown at 18d as the pressure of the gas produced by the pyrolysis of the foam substrate is released. Thus, even smaller pores are provided than those shown in FIG. 3 which are produced by the reticulated nature of the foam. These additional pores greatly increase the number of nucleation sites and permit vapor to be trapped inside the copper skeleton.

We claim as our invention:

1. A method of providing a metal heat transfer tube with a porous nucleate boiling surface comprising the steps of applying a layer of reticulated open cell organic foam material to the external surface of the metal tube and then plating the exposed surfaces of the reticulated foam material with a metal so as to form a reticulated metal surface which overlies the surface of the metal tube and is firmly adhered thereto, said tube being heated after it is plated to pyrolyze the organic foam material and cause the reticulated metal surface which had been plated around the organic foam material to become a hollow metal skeleton capable of trapping vapor when the tube is placed in a liquid boiling medium and releasing some of said vapor through a multiplicity of openings or pores in said skeleton which comprise vapor phase nucleation sites.

2. The method of claim 1 wherein said plating step includes an initial electroless deposit of metal followed by an electro-deposit deposit of metal.

3. The method of claim 1 wherein said layer of foam material is applied by spirally wrapping a strip of said foam material about said tube.

4. The method of claim 1 wherein said plating is made sufficiently thin that portions of it will be fractured by gases developed during pyrolyzation to produce pore openings therein.

5. The method of claim 1 wherein said heating takes place at a temperature of less than about 900° F.

6. The method of claim 1 wherein said foam material has a pore size of about 100 pores per inch.

* * * * *